United States Patent Office 2,856,357
Patented Oct. 14, 1958

2,856,357

DRILLING FLUID

Walter J. Weiss, Sugar Land, and Wilbur L. Hall, Bellaire, Tex., assignors to The Texas Company, New York, N. Y., a corporation of Delaware No Drawing. Application July 25, 1956
Serial No. 599,905

16 Claims. (Cl. 252—8.5)

This invention relates to the drilling of wells through subsurface formations by means of well drilling tools. More particularly, this invention relates to a drilling operation, such as a rotary drilling operation, which involves circulation of a drilling fluid through the well bore and about the drilling bit. In a rotary drilling operation a stream of drilling fluid is continuously pumped down the drill stem to the drilling bit at the bottom of the bore hole. The stream of drilling fluid passes through or about the drilling bit and moves upwardly through the annular space between the drill stem and the well bore wall carrying with it the drilling cuttings.

In some areas, such as in the area of the Gulf Coast of Texas and Louisiana, subsurface formations known as heaving or sloughing shales are penetrated during a well drilling operation. The penetration of these formations while employing conventional aqueous or water-base drilling fluids has been difficult due to the mud-making characteristics or properties of heaving shales. These shales have a tendency to disintegrate by swelling or cracking upon contact with water with the result that the walls of the bore hole become unstable or incompetent and the heaving shale material making up the walls of the bore hole becomes unstable and sloughs into the bore hole. In some instances the heaving shale material swells and sloughs or caves into the bore hole with a resulting enlargement of the bore hole or the formation of a large subterranean cavity.

In addition to the above-indicated difficulties of maintaining a true bore hole when drilling through heaving shale material with a conventional water-base drilling fluid, the resulting finely dispersed heaving shale material taken up into the drilling fluid, because of the mud-making properties of the heaving shale, adversely affects the viscosity characteristics of the drilling fluid. Upon continued accumulation of the dispersed finely divided heaving shale particles in the drilling fluid the viscosity of the drilling fluid increases with the result that the drilling fluid must be thinned by the addition of costly chemicals thereto or by dilution with water. If the drilling fluid is thinned by water dilution the addition of more weighting material, such as barium sulphate (barytes), iron oxide, lead sulphide (galena) and the like is necessary in order to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formations is a high pH, lime-base drilling fluid which contains lime together with quebracho, caustic soda, water, and the conventional hydratable type of drilling clay. High pH, lime-base drilling fluids, however, cannot be employed without considerable difficulty while drilling through the more seriously heaving shale formations. Also, a high pH, lime-base drilling fluid is sensitive to salt or calcium contamination, such as contamination by calcium chloride or calcium sulphate, which leads to clay flocculation with a resulting increase in viscosity and water loss. Although in some instances the desirable viscosity, mud weight and water loss properties of a high pH, lime-base drilling mud can be maintained while drilling through a heaving shale formation by the addition of suitable chemicals, such as the addition of caustic soda and quebracho and the like, the continued addition of these chemicals to the drilling fluid involves considerable expense.

Accordingly it is an object of this invention to provide an improved drilling fluid suitable for drilling through troublesome shale formations of the heaving, sloughing or rapidly dispersing type.

It is another object of this invention to provide a reagent material suitable for the preparation and/or maintenance of a drilling fluid useful for drilling through troublesome shale formations of the heaving, sloughing or rapidly dispersing type.

It is another object of this invention to provide a drilling fluid which is capable of being more readily maintained at a given weight while being employed as a drilling fluid during drilling through heaving or sloughing shale formations.

It is another object of this invention to provide a drilling fluid which is relatively insensitive to salt (NaCl) contamination and to calcium ion contamination, such as may arise while drilling through a gypsum bed or upon encountering a high pressure salt water flow.

It is another object of this invention to provide a composition suitable for the preparation of an aqueous drilling fluid which readily converts heaving shale material exposed in the well bore into a more competent material.

Yet another object of this invention is to provide a drilling fluid reagent material or admixture suitable for the preparation of an alkaline aqueous drilling fluid characterized by an aqueous phase (filtrate phase) having a relatively high dissolved strontium or strontium ion content.

These and other objects of this invention and how they are accomplished will become more apparent in the light of the accompanying disclosure. In at least one embodiment of this invention at least one of the foregoing objects will be achieved.

In accordance with this invention we have provided an alkaline aqueous water base drilling fluid particularly suitable for drilling through a heaving shale formation characterized by a relatively high dissolved strontium or strontium ion content sufficient to effectively stabilize and control the mud-making properties of heaving shale materials or clays in contact with the drilling fluid. More particularly, we have provided an improved alkaline aqueous drilling fluid comprising an alkaline aqueous phase which is substantially saturated with respect to calcium hydroxide and which contains a water-soluble strontium compound having a solubility in said aqueous phase greater than that of calcium hydroxide dissolved therein in an amount sufficient to yield a strontium ion concentration in said aqueous phase of at least about 200 parts per million by weight or a total calcium and strontium ion content of at least about 400 parts per million by weight. Still in accordance with this invention, we have provided a drilling fluid reagent admixture suitable for the preparation of such a drilling fluid or suitable for the preparation of the alkaline aqueous phase thereof.

A drilling fluid in accordance with the practice of our invention may be prepared in the first instance by the addition of the drilling fluid reagent admixture of this invention to a water admixture of hydratable clayey material together with the usual, conventional drilling mud additives (water loss additive, weighting material, emulsifying agent and the like), if desired; or a conventional aqueous drilling fluid may be converted (broken over) to a drilling fluid in accordance with our invention by the addition of the reagent admixture disclosed therein or by the separate addition of the various components making up a drilling fluid in accordance with the teachings of this invention.

A characteristic of an aqueous drilling fluid (which may be a water-base fluid or an oil-in-water emulsion fluid) in the presence therein of an alkaline aqueous phase (filtrate phase), usually having a pH not greater than 12.6, usually in the range 11.2–12.5, although it might have a pH corresponding to the pH of a saturated aqueous solution of strontium hydroxide, about 13. For example, the aqueous phase (filtrate) is saturated with calcium hydroxide and contains a water soluble (solubility greater than that of calcium hydroxide) strontium salt dissolved therein; or the aqueous phase may be saturated with calcium hydroxide and contain strontium hydroxide dissolved therein. The aqueous phase is substantially saturated with respect to calcium hydroxide and contains at least about 200 parts per million (p. p. m.) by weight, preferably in the range 300–1000 p. p. m. or higher, of dissolved strontium, either as the strontium ion, per se, or as a strontium-containing ion.

The aqueous phase of the drilling fluid is alkaline due to the presence therein of dissolved calcium hydroxide, and sometimes due also to dissolved strontium hydroxide, which may be added directly to the drilling fluid either as calcium hydroxide or as hydratable calcium oxide, or strontium hydroxide or strontium oxide, respectively, or created or otherwise generated in situ by metathetical reaction between a water-soluble calcium salt and strontium hydroxide, or by the addition of a water-soluble strontium compound which when dissolved in water yields strontium hydroxide. If desired, the calcium hydroxide and strontium hydroxide may be generated in situ within the aqueous phase by metathetical reaction involving a calcium salt, such as calcium chloride, and a strontium salt, such as strontium chloride, preferably in slight excess, and an alkali metal hydroxide such as sodium hydroxide in an amount not greater than the stoichiometric amount with respect to the added calcium and strontium salt. In any event, it is a characteristic of the alkaline aqueous phase of the drilling fluid of this invention that it is saturated or substantially saturated with respect to calcium hydroxide and in addition contains dissolved strontium derived from a water-soluble strontium compound, such as strontium hydroxide or a strontium salt, such that the strontium ion concentration in the resulting aqueous phase is at least 200 parts per million by weight, preferably in the range 300–1000 parts per million by weight or higher.

The alkaline aqueous phase found in a drilling fluid in accordance with our invention may be prepared by the addition of lime (calcium hydroxide) and a water-soluble strontium salt (strontium chloride) to water; or by the addition of calcium chloride, sodium hydroxide and a water-soluble strontium salt (strontium chloride) to water; or by the addition of strontium hydroxide or strontium oxide and calcium chloride to water; or by the addition of calcium hydroxide and strontium hydroxide or strontium oxide to water. Preferably, in order to insure that the aqueous phase is saturated with respect to calcium hydroxide, there is present in the drilling fluid in contact with the aqueous phase free, undissolved, solid calcium hydroxide.

Suitable water-soluble calcium compounds which may be employed in the preparation of an alkaline aqueous drilling fluid in accordance with this invention include such calcium compounds as calcium hydroxide, hydratable lime, and such water-soluble calcium salts as calcium acetate, calcium nitrate, calcium chloride, calcium formate, calcium gluconate and calcium citrate. Even calcium sulphate may be employed in the preparation of the alkaline aqueous phase in accordance with this invention but its use is not particularly desirable since if the calcium sulfate is added in excess, it yields sulfate ions which form in the presence of strontium ions the relatively water-insoluble strontium sulphate thereby tending to reduce or deplete the strontium ion content of the aqueous phase.

Water-soluble strontium compounds which are useful in the preparation of the aqueous alkaline phase in accordance with this invention include strontium hydroxide, strontium oxide, strontium peroxide or those strontium compounds which yield strontium hydroxide when added to water, or the readily water-soluble strontium salts, that is, those strontium salts which possess a solubility in water greater than that of calcium hydroxide, e. g., strontium chloride, strontium nitrate, strontium formate, strontium acetate, strontium propionate, strontium butyrate and the like.

As indicated hereinabove, in accordance with one feature of this invention there is provided a reagent mixture which may be in liquid form (solution or slurry) but preferably dry solid form which when added to water, which may or may not contain a colloidal hydratable drilling clay, such as a bentonitic type drilling clay therein, provides the desired alkalinity and/or strontium ion content in the aqueous filtrate phase of an aqueous drilling fluid to which the same is added. Such a reagent or additive admixture in accordance with this invention would contain a water-soluble strontium compound, such as strontium hydroxide, or strontium oxide, or other water-soluble strontium compound which upon dissolution in water yields strontium hydroxide, or a water-soluble strontium salt such as strontium chloride, strontium nitrate, strontium acetate and the like, as well as calcium hydroxide or lime. The weight ratio of such an admixture containing a water-soluble strontium compound, such as strontium chloride or strontium oxide or strontium hydroxide and a calcium compound which upon addition to water or by reaction with strontium hydroxide yields calcium hydroxide is usually in the range 1:1–4, respectively. Desirably such a reagent admixture would also contain a suitable clay dispersing agent such as a lignosulfonate, e. g., strontium lignosulfonate, calcium lignosulfonate, e. g., Kembreak, or sodium lignosulfonate, yellow dextrin which is a water-dispersible degradation product of starch, a sodium salt of a polymeric polyphenol derivative obtained as an extract of hemlock bark and sold under the trade name "Rayflo" by the Rayonier Co., Inc., or Indulin A which is a purified pine wood lignin derived from paper pulp sulphate black liquor and sold under the above-mentioned trade name by the West Virginia Pulp and Paper Company, Inc., such as a three component admixture wherein the strontium ion component ($SrCl_2$ or strontium oxide), the calcium hydroxide component (lime or $CaCl_2$) and the clay dispersing component are present in the weight ratio range 0.5–1:0.5–8:0.5–8, respectively. It is mentioned, however, that any suitable dispersing agent may be employed in the admixture in accordance with this invention provided, of course, it is compatible with its environment not only within the reagent admixture but also with its environment within the drilling mud to which it is added, i. e., it is not salted out and does not undergo a chemical reaction or other physical or chemical change which would render it unsuitable or useless as a clay dispersing agent and provided, of course, it exhibits sufficient dispersing power in the drilling fluid to disperse the hydrated drilling clay material in the usual manner within the drilling fluid.

An aqueous drilling fluid prepared in accordance with this invention might also include the usual water loss additives such as prehydrolyzed starch commercially available under the trade name "Impermex" or carboxymethylcellulose (CMC) and the like.

It is pointed out that in an oil-in-water emulsion drilling fluid prepared in accordance with this invention the water loss is low as compared with an oil-free water base mud also prepared in accordance with this invention. Presumably the dispersed emulsified oil phase, usually a diesel oil fraction, decreases or inhibits water loss.

The following tests are illustrative of the practice of this invention and the advantages to be obtained in employing a drilling fluid containing an alkaline aqueous phase saturated with respect to calcium hydroxide and having a relatively high dissolved strontium ion content. In carrying out these tests synthetic heaving or sloughing shale samples, obtained by slurrying Rogers Lake clay, filtering the resulting admixture and aging the resulting filter cake, were immersed into 200 cc. portions of an aqueous alkaline solution prepared, as indicated hereinbelow, in order to demonstrate the advantages of the practice of this invention. The shale samples were immersed for seven days and after this period their appearance was noted and the samples were qualitatively tested for hardness. The results of these tests are set forth in Table No. I.

aqueous phase of a water-soluble strontium compound, such as strontium hydroxide or a strontium salt such as strontium chloride, preferably in an amount to yield a strontium ion concentration in the aqueous phase of at least about 200 p. p. m., although a smaller concentration, e. g., strontium ion concentration in the range 50–150 p. p. m. might also be useful.

As will be apparent to those skilled in the art many alterations, substitutions and changes may be made without departing from the spirit or scope of this invention.

We claim:

1. An aqueous drilling fluid comprising an alkaline aqueous phase consisting essentially of a saturated aqueous calcium hydroxide solution and a water-soluble aqueous strontium compound dissolved therein such that the strontium ion concentration in said aqueous phase is at least 200 parts per million by weight, said aqueous phase having a pH in the range 11.2–13.0.

2. An aqueous drilling fluid comprising a hydratable

Table No. 1

| Test No. | Composition of aqueous phase | $P_f$ | $M_f$ | Versenate cc. Ca and Sr concentration | Cl conc. p. p. m. | pH | Physical Appearance | Hardness |
|---|---|---|---|---|---|---|---|---|
| 1 | Water | | | | | 11.1 | D | −3 |
| 2 | 1 p. p. b. Sr(OH)$_2$.8H$_2$O | 0.95 | 1.05 | 0.90 | | 11.5 | C–ND | −2 |
| 3 | 2 p. p. b. Sr(OH)$_2$.8H$_2$O | 1.85 | 1.95 | 1.60 | | 12.2 | C–ND | −2 |
| 4 | {1 p. p. b. Sr(OH)$_2$.8H$_2$O / ½ p. p. b. SrCl$_2$.6H$_2$O} | 1.0 | 1.1 | 1.28 | 450 | 12.4 | C–ND | 0 |
| 5 | {1 p. p. b. Sr(OH)$_2$.8H$_2$O / 1 p. p. b. SrCl$_2$.6H$_2$O} | | | 1.60 | | 12.5 | C–ND | 0 |
| 6 | {2 p. p. b. Sr(OH)$_2$.8H$_2$O / 1 p. p. b. SrCl$_2$.6H$_2$O} | | | 2.45 | | 12.8 | C–ND | 0 |
| 7 | {2 p. p. b. Sr(OH)$_2$.8H$_2$O / 2 p. p. b. SrCl$_2$.6H$_2$O} | 1.85 | 1.95 | 3.40 | 1,500 | 5.6 | C–ND | 0 |
| 8 | 1 p. p. b. SrCl$_2$.6H$_2$O | | | | | 5.6 | SC–ND | 0 |
| 9 | 2 p. p. b. SrCl$_2$.6H$_2$O | | | | | 12.4 | C–ND | 2 |
| 10 | Sat. Ca(OH)$_2$ | 1.95 | 2.05 | 2.8 | | 12.1 | C–ND | 2 |
| 11 | {Sat. Ca(OH)$_2$ / 1 p. p. b. SrCl$_2$.6H$_2$O} Sat. Ca(OH)$_2$ (solution of Test 1 p. p. b. SrCl$_2$.6H$_2$O 10) diluted 1:1. | 0.95 | 1.0 | 1.5 | | 12.4 | C–ND | 2 |
| 12 | {Sat. Ca(OH)$_2$ / 2 p. p. b. SrCl$_2$.6H$_2$O} | 2.1 | 2.2 | 3.9 | | 12.1 | C–ND | 2 |
| 13 | Sat. Ca(OH)$_2$ (Solution of Test 2 p. p. b. SrCl$_2$.6H$_2$O 12) diluted 1:1. | 1.0 | 1.1 | 1.95 | | 12.6 | C–ND | 2 |
| 14 | {1 p. p. b. Sr(OH)$_2$.8H$_2$O / ½ p. p. b. CaCl$_2$} | 0.98 | 1.03 | 2.08 | 1,050 | 12.5 | C–ND | 2 |
| 15 | {1 p. p. b. Sr(OH)$_2$.8H$_2$O / 1 p. p. b. CaCl$_2$} | 0.95 | 1.0 | 3.23 | 2,000 | 12.5 | C–ND | 2 |
| 16 | {1 p. p. b. Sr(OH)$_2$.8H$_2$O / 2 p. p. b. CaCl$_2$} | 0.90 | 0.95 | 5.09 | 3,500 | 12.9 | C–ND | 2 |
| 17 | {2 p. p. b. Sr(OH)$_2$.8H$_2$O / ½ p. p. b. CaCl$_2$} | 1.90 | 2.05 | 3.09 | 1,050 | 12.9 | C–ND | 2 |
| 18 | {2 p. p. b. Sr(OH)$_2$.8H$_2$O / 1 p. p. b. CaCl$_2$} | 1.85 | 2.0 | 4.24 | 2,000 | 12.8 | C–ND | 2 |
| 19 | {2 p. p. b. Sr(OH)$_2$.8H$_2$O / 2 p. p. b. CaCl$_2$} | 1.65 | 1.85 | 6.3 | 3,500 | | | |

P. p. b. = pounds per barrel (42 gals).
P. p. m. = parts per million by wt.
$P_f$ is the number of ccs. of N/50 H$_2$SO$_4$ required to titrate 1 cc. to phenolphthalein end point.
$M_f$ is the number of ccs. of N/50 H$_2$SO$_4$ required to titrate 1 cc. to methyl orange end point.
Versenate cc. is the number of cc's. of standard Versenate solution required to titrate 1 cc. of the aqueous phase.
Physical appearance: C—cracked; SC—slightly cracked; VSC—very slightly cracked; SS—slightly smoothed; NC—no cracking; D—dispersed; SD—some dispersion; ND—no dispersion.
Qualitative hardness scale: 2—hardened; 1—slightly hardened; 0—no effect; −1—slightly softened; −2—softened; −3—dispersed.

As indicated by the foregoing test data, see tests 10–19, an alkaline aqueous phase saturated with calcium hydroxide and having a relatively high strontium ion concentration effectively stabilizes and hardens a normally dispersing shale. It is this aqueous alkaline phase which is the active and essential component of a drilling fluid prepared in accordance with this invention and which imparts the shale stabilizing and shale hardening properties to the drilling fluid containing the same.

Another feature of this invention is the improvement it imparts to the drilling fluid of the type set forth in our copending patent application Serial No. 484,307, filed January 26, 1955, now abandoned, the disclosures of which are herein incorporated and made a part of this disclosure. In accordance with this feature it appears that the high temperature gelation and other properties of the drilling fluid of the above-identified application might be improved by the incorporation therein in the clayey material dispersed in an alkaline aqueous phase consisting essentially of a saturated aqueous calcium hydroxide solution and a water-soluble strontium compound dissolved therein in an amount to yield a strontium ion concentration in said aqueous phase of at least 200 parts per million by weight, said aqueous phase having a pH in the range 11.2–13.0.

3. A drilling fluid in accordance with claim 2 wherein the concentration of strontium ion in the aqueous phase is in the range 300–1000 parts per million by weight.

4. A water base drilling mud comprising an alkaline aqueous phase, a hydrated drilling clay dispersed in said aqueous phase and a dispersing agent for said clay, said aqueous phase consisting essentially of a saturated aqueous calcium hydroxide solution and a water-soluble strontium compound which has a solubility in said aqueous phase greater than that of calcium hydroxide dissolved therein to yield a strontium ion concentration in said aqueous phase of at least 200 parts per million by weight, said aqueous phase having a pH in the range 11.2–13.0.

5. A drilling mud in accordance with claim 4 wherein said dispersing agent is a lignosulfonate.

6. A drilling mud in accordance with claim 4 wherein said dispersing agent is calcium lignosulfonate.

7. A drilling mud in accordance with claim 4 wherein said strontium compound is strontium chloride.

8. A drilling mud in accordance with claim 4 wherein said strontium compound is strontium hydroxide.

9. A drilling mud in accordance with claim 4 wherein said strontium compound is strontium hydroxide and wherein said aqueous phase contains a strontium ion concentration in the range 300–1000 parts per million by weight and wherein said aqueous phase contains calcium chloride dissolved therein in an amount to form calcium hydroxide in said aqueous phase by metathetical reaction with said strontium hydroxide, the amount of calcium hydroxide being formed in situ being sufficient to saturate said aqueous phase.

10. An aqueous drilling mud comprising an alkaline aqueous phase and a hydrated drilling clay dispersed in said aqueous phase, said aqueous phase consisting essentially of a saturated aqueous solution of calcium hydroxide and a water-soluble strontium compound which has a solubility in said aqueous phase greater than that of calcium hydroxide dissolved therein to yield a strontium ion concentration in said aqueous phase of at least 200 parts per million by weight, said calcium hydroxide having been generated in said aqueous phase by a metathetical reaction by the dissolution in water of a water-soluble calcium salt and strontium compound which when added to water yields strontium hydroxide, said aqueous phase having a pH in the range 11.2–13.0.

11. An aqueous alkaline drilling fluid containing undissolved calcium hydroxide and a dispersing agent for hydrated clayey material and an alkaline aqueous phase containing hydrated drilling clay dispersed therein and consisting essentially of a saturated aqueous calcium hydroxide solution and a water-soluble strontium compound which has a solubility in said aqueous phase greater than that of calcium hydroxide dissolved therein to yield a strontium ion concentration in said aqueous phase of at least 200 parts per million by weight, said drilling fluid containing calcium hydroxide and said dispersing agent in substantially equal amounts by weight, said aqueous phase having a pH in the range 11.2–13.0.

12. An aqueous drilling fluid containing a water-soluble strontium salt, calcium hydroxide and a dispersing agent for hydrated drilling clay in the weight ratio 1:1–4:1–4 respectively, said drilling fluid comprising an alkaline aqueous phase having a pH in the range 11.2–12.6, said aqueous phase consisting essentially of a saturated aqueous calcium hydroxide solution and a water-soluble strontium compound dissolved therein to yield a strontium ion concentration in said aqueous phase of at least 200 parts per million by weight.

13. In the drilling of a bore hole through a heaving shale formation wherein a drilling fluid is passed through the bore hole in contact with the heaving shale formation during the drilling operation, the improvement which comprises contacting said heaving shale formation with an aqueous drilling fluid comprising a hydratable clayey material dispersed in an alkaline aqueous phase, said aqueous phase consisting essentially of a saturated aqueous solution of calcium hydroxide and a water-soluble strontium compound which has a solubility in said aqueous phase greater than that of calcium hydroxide dissolved therein to yield a strontium ion concentration of at least 200 parts per million by weight, said aqueous phase having a pH in the range 11.2–13.0.

14. A drilling mud additive suitable for use in the preparation of an aqueous alkaline drilling fluid useful for drilling through heaving shale comprising an admixture consisting essentially of a water-soluble strontium compound, calcium hydroxide and a clay-dispersing agent in a weight ratio in the range 0.5–1.0:0.5–8:0.5–8, respectively.

15. A drilling mud additive comprising an admixture consisting essentially of substantially equal amounts by weight of a water-soluble strontium salt having a solubility in water greater than that of calcium hydroxide, calcium hydroxide and calcium lignosulfonate as the clay dispersing agent.

16. A drilling mud additive comprising an admixture consisting essentially of substantially equal amounts by weight of a water-soluble strontium salt which has a solubility in water greater than that of calcium hydroxide, calcium hydroxide and a clay dispersing agent.

References Cited in the file of this patent

UNITED STATES PATENTS

| | | |
|---|---|---|
| 2,265,773 | Larkin | Dec. 9, 1941 |
| 2,300,590 | O'Brien | Nov. 3, 1942 |
| 2,371,955 | Dawson et al. | Mar. 20, 1945 |
| 2,491,437 | Perkins | Dec. 13, 1949 |
| 2,571,093 | Temple | Oct. 16, 1951 |
| 2,771,420 | Rowe | Nov. 20, 1956 |
| 2,789,949 | Scotty | Apr. 23, 1957 |